United States Patent Office 3,500,496
Patented Mar. 17, 1970

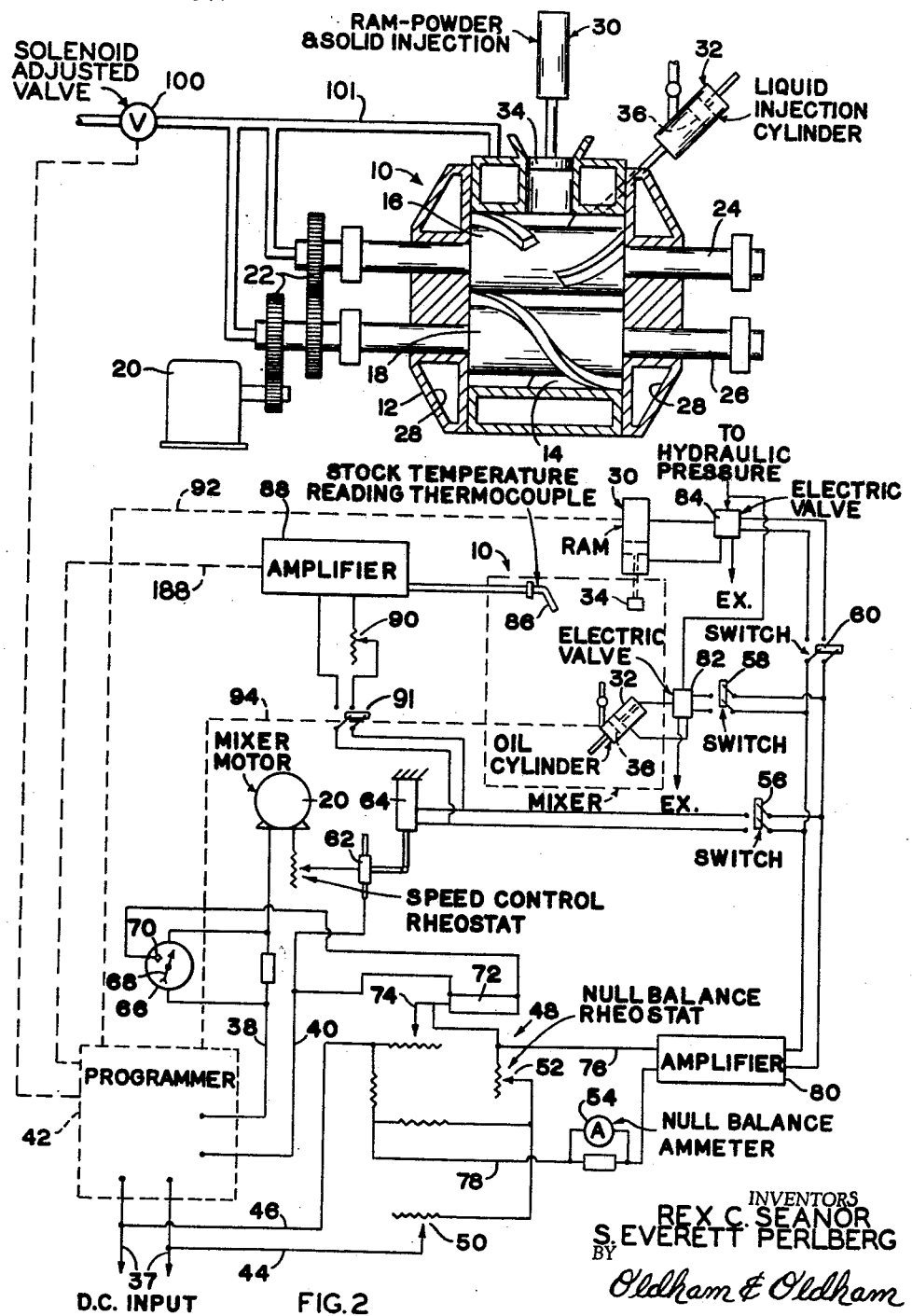

3,500,496
APPARATUS FOR READOUT AND CONTROL OF VISCOSITY OF ELASTOMER IN A MIXING APPARATUS
S. Everett Perlberg, West New York, N.J., and Rex C. Seanor, Akron, Ohio, assignors to Adamson United Company, Akron, Ohio, a corporation of Ohio
Continuation-in-part of application Ser. No. 602,767, Dec. 19, 1966. This application Oct. 16, 1968, Ser. No. 768,056
Int. Cl. B29h 1/10
U.S. Cl. 18—2                              5 Claims

ABSTRACT OF THE DISCLOSURE

The readout and control of the viscosity of elastomeric materials including rubber and plastics in a mixing apparatus for such materials relates to a housing defining a mixing chamber, rotor mixing means in the chamber, and a driving means for the mixing means. The viscosity of the processed batch is measured by electronic means and a control circuit including means for detecting the viscosity of the material in process, and means responsive to the viscosity to change the processing conditions are present. The control circuit also detects a change in temperature of the material in the mixing chamber, and controls are provided to change the processing action and/or to add compounding ingredients dependent upon the batch viscosity at that time.

---

This is a continuation-in-part of our prior application Ser. No. 602,767, filed Dec. 19, 1966, now Patent No. 3,447,201, granted June 3, 1969.

This invention relates to apparatus for working elastomeric materials, such as rubber, plastic, or the like and mixing materials therewith, and for readout and control of the viscosity of the elastomer.

It has been found in the operation of mixing and plasticizing rubber compounds, or the like, that it is desirable to vary the speed of the mixer during a mixing cycle. For example, running the mixer at relatively fast speeds at the beginning of the mixing cycle builds up heat quickly which helps plasticize the mass being mixed. This allows certain additives such as oils, solids, softeners, etc. to be added to the plasticized mass in order to form the compound. Also, slowing the mixing speed down at a selected time and in a selected amount will equalize the heat developed by the mixing action with the heat withdrawal effected by cooling water utilized in the mixer jacket and rotors so as to keep the temperature of the stock constant, or to control the stock temperature.

When an elastomer is being plasticized and ingredients are being worked into the elastomer, it usually is necessary to know the plasticity of the batch in process. Hence, frequently the batch of elastomer is taken off of a mixing mill and stored in slab form while plasticity or other tests are made to see if the batch is of desired physical characteristics. It is known that the viscosity of an elastomer is equivalent or proportional to its plasticity, and the present invention utilizes such fact.

It also has been discovered that as the stock is being plasticized by the mixing operation, certain changes in the torque of the mixer motor and of the stock temperature occur. In accordance with the present invention, these viscosity changes are utilized to determine the precise time at which certain additives are added to the compound being prepared in order to achieve the most desirable results to process the material to obtain the desired viscosity and/or to control the processing conditions as to termination of the processing for other actions.

In processing elastomer materials or other equivalent substances, such as non-newtonian fluids, it has been established that the viscosity of the processed material is also a function of the temperature. In general, in mixing the various additives with elastomer materials and other substances, there are predetermined points in the mixing cycle, normally determined by the temperature of the mix in process, or by the viscosity or plasticity of the mix, at which the various ingredients should be added. By measuring the motor torque in relation to the stock temperature and to the time or length of the mix cycle, one can determine proportionately, from the torque required for processing a given batch of material at a predetermined speed, what the plasticity or viscosity of the mixed stock is at any given interval of time.

The viscosity of a processed stock in general is measured to indicate any changes in the structure of the polymer being processed. Hence, when there is a change in its polymer structure, there is naturally a change in the molecular weight of the processed material, so that indications are provided to enable the control of the mixing cycle or action, or the setting up the standards therefor so that one can obtain a uniform viscosity in the processed elastomer.

By the present invention, it is a principal object thereof, to measure the viscosity of the processed material right in the processing machine, rather than by presenting any sample from the mixed material for separate testing action, such as in a Mooney tester.

It is a further object of the present invention to allow continuous processing of the materials through mixing and blending cycles and to enable such materials to be put immediately into production operations, rather than requiring any storage and testing of the material in process.

Other objects of the present invention are to provide an apparatus which automatically detects and utilizes changes in a measured viscosity of material in a mixer apparatus and which automatically utilizes such changes to effect the introduction of additives to the compound, and/or to automatically change the speed of the driving means; and/or to extend the processing time for a stock until a predetermined level of viscosity is obtained; and/or to maintain a constant temperature in the stock being processed for sufficient time until the driving means torque reaches a desired value to indicate that the stock viscosity is proper.

It is a further object of the invention to control the viscosity of the material being mixed and to permit viscosity readings as a quality standard as a stock is being processed without the need for separate sampling from the mixed materials.

For a better understanding of the invention, reference should be had to the following drawings wherein;

FIG. 1 is a diagrammatic, vertical cross sectional view of a typical mixing apparatus utilized in the invention; and FIG. 2 is a schematic view of the control circuits employed with the apparatus of FIG. 1.

In the mixing actions of the present invention, the mixing and control functions can be performed on a time or on a temperature control basis, but primarily, the mixing is done on a viscosity measuring standard so that materials are added to the processed material in relation to its then batch viscosity. It is also possible to make time a function of the temperature by maintaining the temperature of a processed stock uniform while other actions are performed thereon and until the desired controlled viscosity conditions are estabished. By selecting a maximum temperature, the time is now independent of the temperature and the discharge can be controlled solely by the viscosity of the processed stock.

The new apparatus for readout control of the viscosity of elastomeric materials being mixed in a rotary mixing means in a housing defining a mixing chamber, comprises, in general, cooling means having a variable flow rate for the housing and/or rotor means operatively connecting thereto means driving the rotary mixing means, electrical means for detecting a change in viscosity in the elastomer, electrical means for detecting the temperature of the elastomer in the mixing chamber, and electrical control means responsive to both of the electrical means for control of the viscosity of the material in process.

Referring to the drawings in greater detail, and with particular reference to FIG. 1, the number 10 generally indicates a typical internal intensive mixer for elastomers such as natural or synthetic rubber, plastic, and the like. The mixer 10 basically consists of a housing 12 which defines a mixing chamber 14 which receives the stock to be mixed. A pair of cooperating rotors 16 and 18 are positioned for rotatable movement in the mixing chamber 14 and a motor or other suitable driving means 20, acting through suitable gears 22 and drive shafts 24 and 26, effects a rotation of rotors 16 and 18 in the mixing chamber. The mixing and blending of the compounds introduced into the mixing chamber 14 is done by kneading the batch between the rotors 16 and 18 and against the chamber walls. Usually the motor 20 is of variable speed. Cooling or heating chambers 28 are provided in the housing 12, and often in the rotors 16 and 18 as well, and temperature control water or vapors is adapted to circulate therethrough in order to keep the stock from scorching but principally to control the temperature of the stock while the stock is being mixed, masticated, or fluxed.

As mentioned hereinbefore, at predetermined times of the mixing operation, it is necessary to add certain additives to the mixing compound, such as oils, solids, softeners, etc. In order to accomplish this purpose, a ram 30 and a liquid injection cylinder 32 are operatively connected to the mixing chamber 14. The ram 30 has a pneumatic or hydraulic powered piston 34 which, when actuated, pushes any solid additives into the mixing chamber. Liquid injection cylinder 32 also consists of a powered piston 36 which is adapted to inject liquid additives such as oil into the mixing chamber.

The present invention provides mechanism whereby the ram 30 and the liquid injection cylinder 32 are actuated in a controlled manner to inject additives into the mixing chamber at the proper time sequence in the mixing cycle, and/or when proper operating conditions, such as the desired viscosity of the batch in process, are established. Also, since it is often desirable to maintain the stock temperature constant to provide most effective mixing, another feature of the present invention is to provide apparatus for automatically changing or maintaining the speed of the drive means or motor 20 at an automatically selected time, for example, at the same time additives are injected into the mixing chamber 14 by the ram 30 and the liquid injection cylinder 32.

Referring to FIG. 2, this figure illustrates the control circuit utilized to effect the automatic action of the mixer apparatus. Specifically, the mixer motor 20 is powered by a direct current input 37 or slip coupling through leads 38 and 40 from a programmer 42. The separate field circuit for the D.C. motor is not shown. At the same time, current is directed by input leads 44 and 46 to a Wheatstone bridge circuit, generally indicated by the numeral 48. A manually controlled rheostat 50 in the lead 44 is provided so that a controllable relatively small input current is directed to the Wheatstone bridge circuit 48.

Upon start of the mixing cycle as power is fed into the programmer 42 and to the mixer motor 20, a null balance rheostat 52 is manually adjusted so that the Wheatstone bridge circuit 48 is brought into balance. The operator, by adjusting the rheostat 52 until a null balance ammeter 54 in the output of the bridge registers zero, can make sure that the Wheatstone bridge is in balance. The output of the bridge 48 passes to an amplifier 80. Switches 56, 58 and 60, positioned in the output circuit of the amplifier, are open at this time since a small current will pass to amplifier 80 and on to the actuation circuitry of the mixer apparatus until the null balance rheostat is adjusted to bring the Wheatstone bridge 48 into balance. As soon as the operator, by adjusting null balance rheostat 52 brings the bridge 48 into balance, switches 56, 58 and 60 are closed.

As mentioned hereinbefore, the torque output of the mixer motor 20 varies in a predetermined fashion in a standard mixing cycle. It is, therefore, the purpose of the circuitry illustrated in FIG. 2 to actuate the ram 30 and oil cylinder 32, automatically, and to change the speed of the mixer motor 20 in accordance with designated indications of viscosity as measured by changes in stock temperature or in torque output of the mixer motor 20, both being based on the then viscosity of the batch in process. In order to accomplish this desired result, a speed control rheostat 62, operatively affixed to a spring tensioned solenoid 64, is utilized to change the speed of the mixer motor 20.

A contact point ammeter 66 is utilized to read the amount of current flow to the mixer motor 20. The contact point ammeter 66 is adapted to remain open as long as at least a predetermined amount of current is drawn by the mixer motor 20. When, however, the current requirements of the mixer motor 20 drop below a preset level of measurement, the arm 68 on ammeter 66 contacts the adjustable contact point 70 so that an electric current passes to a spring tensioned solenoid 72. Actuation of the solenoid 72 effects movement of a bridge balance rheostat 74 which is operatively connected to the solenoid 72. Movement of the bridge balance rheostat 74 effects a change of resistance on one of the legs of the Wheatstone bridge 48 whereby the bridge is thrown out of balance. As the unbalancing occurs, current is directed through leads 76 and 78 to amplifier 80. At this time, the null balance ammeter 54 again registers a current flow.

Since the switch 56 is now closed, the amplifier 80 passes a current to the solenoid 64 with the actuation of the solenoid 64 causing a repositioning of the speed control rheostat 62 to thereby effect a change in motor speed of the mixer motor 20. Reduction of the resistance in the rheostat 62 increases the motor voltage and proportionately increases the motor speed. At the same time, if by choice, the switch 58 has been closed, current is directed to an electrically actuated valve 82 which is operated to effect actuation of the piston 36 in liquid injection cylinder 32 so that liquid additives are injected into the mixing chamber 14. If, by choice, the switch 69 has also been closed, an electric current is passed to electrically actuated valve 84 which is operated to effect actuation of the ram 30 so that the piston 34 pushes any powder or solid additives into the mixing chamber 14.

It should be noted here that any or all of the switches 56, 58 and 60 can be left open so that the change in torque on the mixing motor to indicate batch viscosity can effect any selected one, two, or all three of the functions of change of motor speed, the time of adding of powders, and/or of liquids to the mix, or the water or temperature control means flow rate or the pressures on the rams in cylinders 30 and 32 can be varied. Thus, five factors can control or vary the operating conditions in the apparatus and any one or more of these factors can be used for varying or controlling the mix conditions and hence the viscosity of the batch in process.

Should the addition of additives cause the mixing stock to become more viscous, more current will be required and usually be automatically pulled by the mixer motor 20 so that the needle 68 of the ammeter 66 may once again register above the preset level of the bridge balance rheostat 74 and opening the circuit of the ammeter 66 will once again bring the bridge 48 into balance.

Instead of having an adjustable contact 70 in the ammeter 66, it is possible to provide a plurality of resistance contacts 70 over which the needle 68 or a similar adjustment can move to supply a variable voltage to the solenoid 72. This provides a variable voltage control to the motor 20 to provide a wide variety of motor speeds instead of only the several provided by a single contact 70.

It is also possible to control the actuation of the ram 30 and liquid injection cylinder 32, and the speed of the mixer motor 20 in accordance with changes in the temperature of the mixing stock instead of or as well as changes in torque requirements of the mixer motor 20. This is accomplished by use of a stock temperature reading thermocouple 86 suitably positioned in contact with the mixing stock to pass its temperature in terms of electric current to an amplifier 88. The output from the amplifier passes through a temperature control rheostat 90 to the solenoid 64 after the temperature of the stock in the mixing chamber rises above a predetermined point. This is accomplished by simply manually moving the temperature control rheostat 90 to a selected point whereby no operative current signal is directed to the solenoid 64 until after the stock temperature approches a certain level. When such occurs, solenoid 64 is actuated to change the position of the speed control rheostat 62 to effect a change in the speed of the mixer motor 20. At the same time a signal is sent to the solenoid 64, a signal may be sent by selectively closing switches 56, 58 and/or 60 and a switch 91 from the amplifier 88 to valves 82 and 84 to effect operation of the ram 30 and liquid injection cylinder 32.

It should be also noted that the mixing apparatus of the invention is readily adaptable to be controlled completely by the programmer 42. For example, the lead 92 from the programmer to the ram 30 and lead 94 from the programmer to the liquid injection cylinder 32 allow the programmer to control the actuation of these units, and also the motor 20, independently from any signals from the stock temperature reading thermocouple 86 or the ammeter 66. The programmer, of known type, usually employs a card or tape to control the entire mixing cycle. The apparatus of the present invention can be used without the programmer, but normally is employed in addition to the programmer to provide overriding additive functions.

One of the advantages of controlling the speed of the motor 20 from the temperature of the stock, all as just described, is that the motor speed is automatically increased or decreased by increments to keep the stock at a constant temperature as the temperature thereof decreases, or increases, respectively, to obtain, or maintain, a desired stock viscosity. In other words, the heat generated during mixing is function of motor speed, so that by changing the motor speed, the generated heat can be kept equal to the heat withdrawn by radiation and by the heat transfer medium circulated through the mixer.

As indicated hereinabove, a predetermined low or set temperature can be set up by the operating conditions so that solids, for example, are only added to the processed material when the temperature of the mix or batch is at such predetermined low value that such addition does occasion only an acceptable immediate temperature rise in the elastomers being processed.

Yet another feature of the present invention is that the temperature control action in the apparatus can be aided by varying the rate of flow of heat transfer means through the chambers 28 provided in the housing of the apparatus 10 and in any heat transfer flowing through the rotor shafts in the apparatus. Hence, proper controls could be provided in the temperature system for varying flow of the water or other medium and effect temperature control (and indirectly viscosity) in the processed material by the rate of flow rather than just by variations in the motor speed. And, by such a control, the temperature of the stock being mixed can be maintained substantially at a constant pre-set level.

For example a control function or signal can be given by the programmer to an electrically actuated adjustable control valve 100 connected in a temperature control conduit 101 for the housing 12 and/or rotors 16 and 18 and connected to a suitable source of temperature control liquid to increase or decrease fluid flow dependent upon the then operating conditions in the mixer and the indicated viscosity of the stock dependent upon whether the viscosity is to be decreased, or increased, by temperature decrease or increase, respectively. Only a portion of the liquid flow circuit is shown and it is indicated diagrammatically.

A timer, not shown, is included in the programmer to add ingredients at predetermined intervals. Hence, the programmer 42 connects to the leads extending from the switches 58 and 60 to close circuits thereby only when the batch theoretically is at proper operating conditions.

The amplifier 88 for the temperature sensing means also is connected to the programmer 42 by lead 188 to feed a signal thereto. The programmer 42 integrates the inputs from the motor torque leads 38 and 40 and the lead 188.

Conventional time delay means are connected to the electric valves 82 and 84 to retain them in operative positions for intervals to enable proper feed of compounding ingredients into the chamber 14.

It should be noted that a suitable recording and/or visual instrument, operated by current flow, can be provided in the lead 38. That is, by sampling a mix of stock at regular intervals as the mixing thereof progresses and determining the viscosity of such samples, standards for reading the viscosity of such particular mix can be established. Hence, in processing other batches of the same stock, the current viscosity of the stock can be determined by comparison with the previous readings.

While a certain representative embodiment and details have been shown for the purpose of illustrating the invention, it will be apparent to those skilled in this art that various changes and modifications may be made therein without departing from the spirit or scope of the invention.

What is claimed is:

1. Apparatus for readout and control of the viscosity of elastomeric materials being processed and comprising
   a housing defining a mixing chamber,
   rotary mixing means in the chamber,
   cooling means having a variable flow rate for said housing and rotor means operatively connecting thereto,
   a variable speed means driving said rotary mixing means,
   electrical means for detecting a change in viscosity in the elastomer, and
   electrical control means responsive to said electrical means connected to said cooling means to change the rate of flow of coolant in said cooling means for control of the viscosity of the material in process.

2. Apparatus for readout and control of the viscosity of elastomeric materials being processed and comprising
   a housing defining a mixing chamber,
   rotary mixing means in the chamber,
   cooling means for said housing operatively connecting thereto,
   a variable speed motor driving said rotary mixing means,
   electrical means for detecting a change in viscosity in the elastomer,
   electrical means for detecting the temperature of the elastomer in the mixing chamber, and
   electrical control means responsive to both of said electrical means to change the speed of the motor for control of the viscosity of the material in process.

3. Apparatus as in claim 2 where said electrical control means include means to select the viscosity at which the stock is maintained.

4. Apparatus as in claim 2 where said electrical control means include means to select the temperature and viscosity at which the stock is maintained.

5. Apparatus for readout and control of the viscosity of elastomeric materials being processed and comprising
a housing defining a mixing chamber,
rotary mixing means in the chamber,
a variable speed drive means driving said rotary mixing means,
electrical means for detecting a change in viscosity in the elastomer by a change in the temperature of the elastomer in the mixing chamber,
electrical control means responsive to said electrical means connected thereto,
electrically controlled injection means for forcing a material into said housing, and
said electrical control means will actuate said injection means when predetermined viscosity exists in a processed elastomer after a predetermined time of mixing.

References Cited
UNITED STATES PATENTS

| | | |
|---|---|---|
| 2,540,146 | 2/1951 | Stober. |
| 3,274,308 | 9/1966 | Freeman et al. |
| 3,339,228 | 9/1967 | Seanor et al. |
| 3,357,049 | 12/1967 | Spendler. |

WILLIAM J. STEPHENSON, Primary Examiner